United States Patent Office 2,717,899
Patented Sept. 13, 1955

2,717,899

AMINOALKYL AND QUATERNARY AMMONIUM ALKYL ESTERS OF o-AROYL BENZOIC ACIDS

Georg E. Cronheim, Bristol, Va., and Norman H. Leake and Marvel L. Fielden, Bristol, Tenn., assignors to The S. E. Massengill Company, Bristol, Tenn., a corporation of Tennessee No Drawing. Application May 26, 1952,
Serial No. 290,082

21 Claims. (Cl. 260—469)

This invention relates to new organic compounds which possess therapeutic properties. More specifically it relates to new amino alcohol and quaternary ammonium alcohol esters.

The object of this invention is to provide new and useful compounds of the general formula:

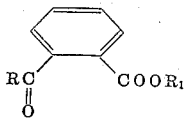

wherein R is phenyl which is substituted with alkyl, halogen or nitro groups and $R_1$ is aminoalkyl or quaternary ammonium alkyl. The amino and quaternary ammonium groups may be unsubstituted or may have one or more of the hydrogen atoms replaced by hydrocarbon radicals. Another object is to provide new compounds which are therapeutically beneficial.

The esters of our invention may be prepared by reacting the acid halide with an amino alcohol or quaternary ammonium alcohol in solution. The quaternary ammonium derivatives can also be made from the tertiary aminoalcohol ester, as by reacting the ester with an organic halide such as an alkyl halide.

The free esters are generally oils, while their acid salts, such as the hydrochloride, tartrate, fumarate, sulfate and the like, are crystalline solids. Although both the free ester and its acid salts are therapeutically effective, the use of the solid salts is more convenient. The acid salts are readily prepared by the addition of the desired acid to the basic ester in solution. Neutralization of the acid salt to form the free ester is accomplished with an alkaline reagent such as sodium hydroxide, sodium carbonate and the like.

The benzoyl group is in the ortho position on the carboxylated phenylene ring and is substituted with at least one or more halogen, nitro or alkyl groups, such as methyl, ethyl, propyl, butyl, amyl and the like. Where more than one of these groups is present, the substituent radicals may be the same or different.

The esterifying aminoalcohols which may be employed for our purpose comprise primary, secondary and tertiary amino-alcohols, including N-heterocyclic derivatives, as for example: ethanol amine, ethylaminoethanol, isopropylaminoethanol, cyclohexylaminopropanol, dimethylaminoethanol, diethylaminoethanol, dipropylaminoethanol, dibutylaminoethanol, β-diethylamino-α-methylethanol, γ-diethylaminopropanol, diethylaminobutanol, morpholinoethanol, piperidinopropanol and the like. The alkyl substituted aminoalkanol esters are particularly effective for our purpose.

The quaternary ammonium alkyl esters are preferably alkyl substituted, as with ethyl, propyl, butyl and the like. Other substituent groups may also be used such as cyclohexyl, phenyl, benzyl, etc.

The carbonyl esters of our invention may exist in the form of the γ-keto ester or in the form of the tautomeric γ-lactone as follows:

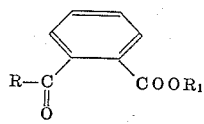

or

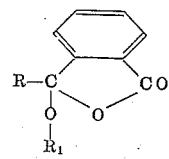

Apparently the compounds tend to exist for the most part almost entirely in one form or the other and occasionally as mixtures of the two. The pharmacological properties of the compounds do not appear to be altered by their tautomeric characteristics and both the normal ester and the lactone form are similarly effective. It will be understood that the carbonyl esters as disclosed and claimed encompass both tautomeric forms.

More detailed practice of our invention is illustrated by the following examples which, however, do not limit the scope of the invention:

Example 1 o-(p-Toluyl)benzoyl chloride was prepared by treating o-(p-toluyl)-benzoic acid with thionyl chloride in chloroform solution under reflux for several hours. Diethylaminoethyl alcohol in dry chloroform was added to the acid chloride. The solution was refluxed, filtered, acidified, diluted with ether and extracted with very dilute HCl until the extract gave no precipitate upon being made alkaline. The aqueous extract was diluted with water, washed several times with ether and treated with charcoal. The resulting clear solution was made alkaline; the oil was extracted with ether and the ether extract was washed with water and dried to give β-diethylaminoethyl o-(p-toluyl)-benzoate.

The hydrochloride was made by adding an ethereal solution of hydrogen chloride to the free base. The resulting β-diethylaminoethyl o-(p-toluyl)-benzoate hydrochloride is a crystalline solid which melts at 128–31° C. and apparently exists in the form of the γ-lactone.

Example 2

β-Diethylaminoethyl o-(p-chlorobenzoyl)-benzoate and its hydrochloride salt were prepared according to the process outlined in Example 1. The free base is an oil and the hydrochloride salt is a crystalline solid which melts at 132–4° C. and apparently exists in the form of the normal γ-keto ester.

Example 3

β-Diethylaminoethyl o-(4-chloro-3-nitrobenzoyl)-benzoate and its hydrochloride salt were prepared according to the process outlined in Example 1. The free base is an oil and the hydrochloride is a crystalline solid which melts at 132–5° C. The compound appears to exist in the form of the γ-keto ester.

Example 4

The quaternary ammonium alcohol derivatives may be made by adding an organic halide to the amino alcohol ester. For example, β-methyldiethylammonium ethyl o-(p-toluyl)-benzoate bromide may be prepared by adding an ether solution of methyl bromide to β-diethylaminoethyl o-(p-toluyl)-benzoate, allowing the mixture to stand for several hours and then separating and recrystallizing the resulting compound.

The compounds of this invention are highly effective as antispasmodics. They also possess antihistaminic properties. Toxicity is low, being less than that of papaverine, which is frequently employed as a standard.

Although this invention has been described with reference to illustrative embodiments thereof, it will be apparent to those skilled in the art that the principles of this invention may be embodied in other forms but within the scope of the claims.

We claim:
1. The compounds having the general formula:

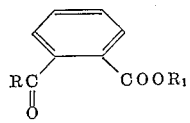

wherein R is phenyl substituted in the ring with at least one group selected from the group consisting of chlorine, nitro and lower alkyl, and $R_1$ is selected from the group consisting of di-lower alkyl-amino-lower alkyl and tri-lower alkyl quaternary ammonium lower alkyl, said compounds existing in a form selected from the group consisting of the γ-keto ester, the γ-lactone and a mixture of said two forms.

2. The compounds having the general formula:

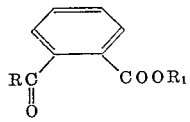

wherein R is nitro-substituted phenyl and $R_1$ is diethylaminoethyl, said compounds existing in a form selected from the group consisting of the γ-keto ester, the γ-lactone and a mixture of said two forms.

3. The compounds having the general formula:

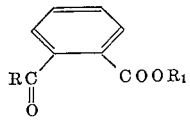

wherein R is lower alkyl-substituted phenyl and $R_1$ is diethylaminoethyl, said compounds existing in a form selected from the group consisting of the γ-keto ester, the γ-lactone and a mixture of said two forms.

4. The solid acid salts of the compounds having the general formula:

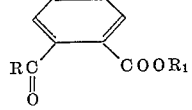

wherein R is nitro-substituted phenyl and $R_1$ is diethylaminoethyl, said compounds existing in a form selected from the group consisting of the γ-keto ester, the γ-lactone and a mixture of said two forms.

5. The hydrochloric acid salts of the compounds having the general formula:

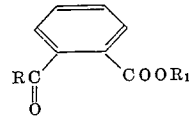

wherein R is nitro-substituted phenyl and $R_1$ is diethylaminoethyl, said compounds existing in a form selected from the group consisting of the γ-keto ester, the γ-lactone and a mixture of said two forms.

6. The hydrochloric acid salts of the compounds having the general formula:

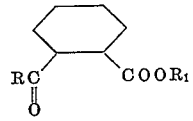

wherein R is lower alkyl-substituted phenyl and $R_1$ is diethylaminoethyl, said compounds existing in a form selected from the group consisting of the γ-keto ester, the γ-lactone and a mixture of said two forms.

7. The solid acid salts of the compounds having the general formula:

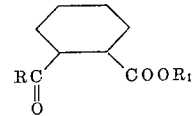

wherein R is lower alkyl-substituted phenyl and $R_1$ is diethylaminoethyl, said compounds existing in a form selected from the group consisting of the γ-keto ester, the γ-lactone and a mixture of said two forms.

8. The compounds having the general formula:

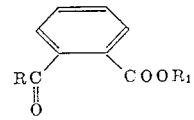

wherein R is chlorine-substituted phenyl and $R_1$ is di-lower alkyl-amino-lower alkyl, said compounds existing in a form selected from the group consisting of the γ-keto ester, the γ-lactone and a mixture of said two forms.

9. The compounds having the general formula:

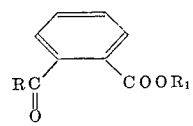

wherein R is chlorine-substituted phenyl and $R_1$ is diethylaminoethyl, said compounds existing in a form selected from the group consisting of the γ-keto ester, the γ-lactone and a mixture of said two forms.

10. The solid acid salts of the compounds having the general formula:

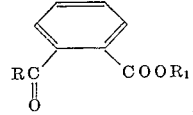

wherein R is chlorine-substituted phenyl and $R_1$ is di-lower alkyl-amino-lower alkyl, said compounds existing in a form selected from the group consisting of the γ-keto ester, the γ-lactone and a mixture of said two forms.

11. The solid acid salts of the compounds having the general formula:

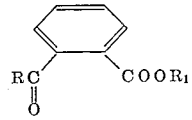

wherein R is chlorine-substituted phenyl and $R_1$ is diethylaminoethyl, said compounds existing in a form selected from the group consisting of the γ-keto ester, the γ-lactone and a mixture of said two forms.

12. The hydrochloric acid salts of the compounds having the general formula:

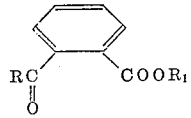

wherein R is chlorine-substituted phenyl and $R_1$ is diethylaminoethyl, said compounds existing in a form selected from the group consisting of the γ-keto ester, the γ-lactone and a mixture of said two forms.

13. The compounds having the general formula:

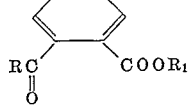

wherein R is nitro-substituted phenyl and $R_1$ is di-lower alkyl-amino-lower alkyl, said compounds existing in a form selected from the group consisting of the γ-keto ester, the γ-lactone and a mixture of said two forms.

14. The compounds having the general formula:

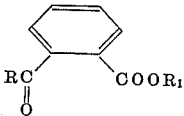

wherein R is lower alkyl-substituted phenyl and $R_1$ is di-lower alkyl-amino-lower alkyl, said compounds existing in a form selected from the group consisting of the γ-keto ester, the γ-lactone and a mixture of said two forms.

15. The solid acid salts of the compounds having the general formula:

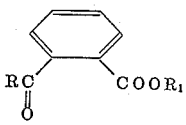

wherein R is nitro-substituted phenyl and $R_1$ is di-lower alkyl-amino-lower alkyl, said compounds existing in a form selected from the group consisting of the γ-keto ester, the γ-lactone and a mixture of said two forms.

16. The solid acid salts of the compounds having the general formula:

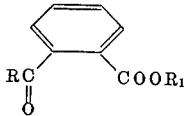

wherein R is lower alkyl-substituted phenyl and $R_1$ is di-lower alkyl-amino-lower alkyl, said compounds existing in a form selected from the group consisting of the γ-keto ester, the γ-lactone and a mixture of said two forms.

17. The β-diethylaminoethyl ester of o-(p-toluyl)-benzoic acid.

18. The β-diethylaminoethyl ester of o-(p-chlorobenzoyl)-benzoic acid.

19. The β-diethylaminoethyl ester of o-(4-chloro-3-nitrobenzoyl)-benzoic acid.

20. The hydrochloride of the β-diethylaminoethyl ester of o-(p-toluyl)-benzoic acid.

21. The hydrochloride of the β-diethylaminoethyl ester of o-(p-chlorobenzoyl)-benzoic acid.

References Cited in the file of this patent

Samdahl et al., Bull. Soc. Chim. 5, 1573–80 (1938).
McElvain et al., J. Am. Chem. Soc., 68, 2592–2600 (1946).